3,271,005
MECHANICAL OVERSPEED PREVENTION DEVICE
George R. Jones, Arvada, Colo., assignor to Sundstrand Corporation, a corporation of Illinois
Filed Mar. 2, 1964, Ser. No. 348,590
8 Claims. (Cl. 253—59)

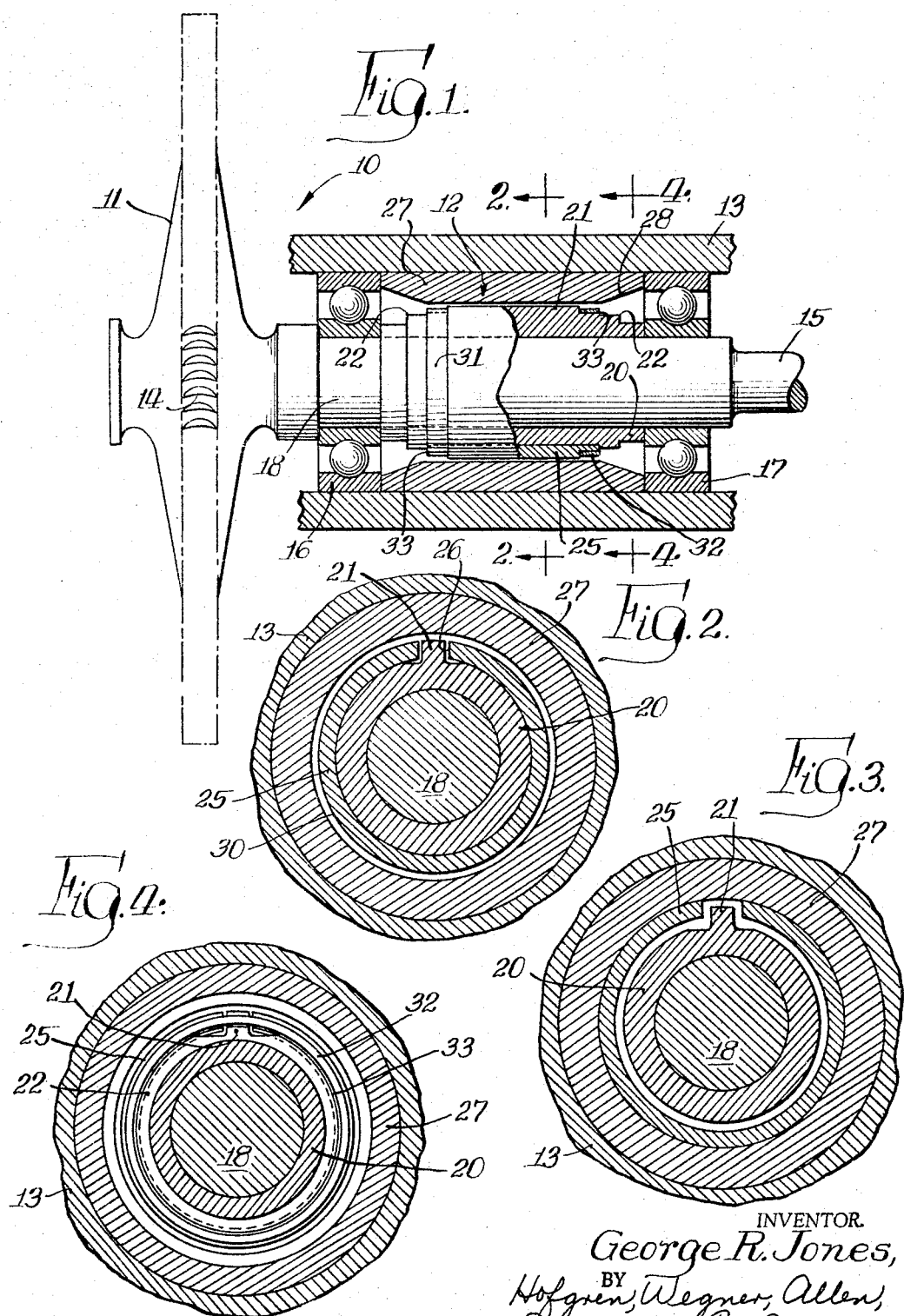

This invention relates generally to a failsafe brake for preventing turbine overspeeding, and more specifically relates to an expandable brake for retarding and stopping turbine wheels before any damage occurs.

Turbine drive units are conventionally employed as prime movers for driving loads where a high speed characteristic is desired. One of the major problems in a turbine drive is that the unloaded equilibrium speed exceeds the burst speed of the turbine, i.e. the speed at which the turbine will disintegrate under centrifugal forces. Since the conventional sources of gas pressure for supplying the motive fluid to the turbine buckets are capable of producing exceedingly high pressures, there is a possibility that the "burst speed" of the turbine unit will be exceeded when a malfunction occurs resulting in destruction of the drive unit and injury to human personnel in the area. While overspeed protection systems of the non-failsafe type are conventional, such as a purely centrifugal brake, or automatic shutoff valves responsive to a speed signal, such systems are undesirable because they must function positively to prevent overspeed. The damage resulting from overspeed burst is invariably so severe that a failsafe device of maximum reliability is desirable. In the present invention, a self-engaging device, interposed between the rotating turbine and the stationary turbine housing, is restrained in a disengaged condition by a retainer which will fracture as a result of centrifugal force, produced by a predetermined overspeed, permitting the engagement of the braking device, causing deceleration of the turbine to a state of rest in spite of the accelerating efforts of the propellant, and maintaining that state of rest thereafter. While the braking torque should be sufficient to stop the turbine unit, it is necessary that the torque be controlled to a level below that which would cause failure of the turbine wheel or wheels, or the turbine support shafting.

It is, therefore, a primary object of the present invention to provide a simplified speed sensitive brake in which the braking force is primarily self-contained in the brake shoe.

Another object of the present invention is to provide a simplified turbine overspeed brake which is responsive to centrifugal force of the brake shoe and the potential energy stored within the brake shoe. While purely centrifugal brakes may be used to control excessive turbine speed, it was found that they lack certain essential characteristics when used in a turbine drive train. Firstly, the purely centrifugal brakes are slow acting and oftentimes fail to control the turbine speed before disintegration occurs, and secondly, the purely centrifugal brakes merely drag the turbine below some predetermined speed and then release the turbine permitting the same malfunction to overspeed the turbine again, increasing the likelihood of disintegration or failure. In the present invention, the brake shoe is prestressed so that after the shoe is released when the turbine reaches a predetermined excessive speed, the brake is energized and cannot thereafter be released even though the turbine passes through the normal speed range.

A further object of the present invention is to provide a simplified self energizing safety brake for a turbine wheel drive in which the brake shoe has 360° of surface contact with the brake drum. Prior centrifugal brakes have segmental brake shoes because of the shoe operating levers, and therefore it was not possible to obtain maximum brake shoe area. In the present invention, since the brake shoe is self-energizing and needs no operating levers, the brake shoe may extend almost 360° thereby providing maximum brake shoe area.

Other and further objects of the invention will be readily apparent from the following description in the accompanying drawings, in which:

FIGURE 1 is a side elevation, partly in cross section of the turbine wheel and safety device;

FIGURE 2 is a cross section, taken along line 2—2 of FIGURE 1, showing the brake shoe in its prestressed position;

FIGURE 3 is a cross section of the safety device as shown in FIGURE 2 with the brake shoe in its partially relaxed or engaged position; and FIGURE 4 is a cross section, taken along line 4—4 of FIGURE 1, showing one of the retaining rings holding the brake shoe in the disengaged position.

While this invention is susceptible of embodiment in many different forms, there is shown in the drawings and will herein be described in detail, one specific embodiment of the invention, with the understanding that the present disclosure is to be considered as an exemplification of the principles of the invention and is not intended to limit the invention to the embodiment illustrated. The scope of the invention will be pointed out in the appended claims.

Referring now to FIGURE 1, the turbine unit, generally designated by the numeral 10, consists of a turbine wheel 11 and a failsafe brake 12, both mounted within the turbine casing 13 (only partially shown). Although not shown, it should be understood that a source of compressed propellant is directed against and rotates the turbine blades 14 through nozzles mounted within the casing 13 connected to a suitable propellant generator. A shaft 15 is integrally formed with the turbine wheel and delivers power from the turbine to any desired load such as a jet engine. The shaft 15 is accurately aligned within the housing 13 by two spaced roller bearings 16 and 17. Shaft 15 may be reduced as at 18 adjacent the inner race of the bearing 16 to prevent axial movement of the turbine wheel within the housing.

The failsafe brake 12, as viewed in FIGURE 1, is seen to be a very compact unit which fits easily within the narrow confines of the turbine housing. As viewed in FIGURES 1 and 2, a generally cylindrical sleeve 20 is press fitted onto the turbine shaft 15 for rotation therewith. Alternatively the sleeve 20 could either be keyed to the shaft 15 or formed integrally therewith. An axially extending key 21 is formed on one side of the sleeve 20 and extends to the shoulders 22 near both ends of the sleeve 20. The key 21 serves to transmit rotary motion from the turbine shaft 15 to a cylindrical brake shoe 25 mounted upon and surrounding the sleeve 20. The cylindrical shoe 25 may typically be constructed of AISI 4340 molybdenum steel so that it may be compressed to the position shown in FIGURE 2. A slot or separation 26 formed in the cylindrical shoe 25 permits the shoe to expand and compress and also provides interengaging surfaces with the key 21 so that the driving force of the turbine is transmitted to the brake shoe 25. A brake drum 27, cylindrical in shape with chamfered ends as shown at 28, is non-rotatably mounted within the casing or housing 13 either by keyways (not shown) or a suitable bonding material. An "S" Monel metal was found to be a suitable material for the drum 27. Braking torque is transmitted from the brake drum 27 to the brake shoe 25, and to the turbine wheel through the key 21.

An important aspect in the construction of the brake shoe is that the diameter of the brake shoe, when in its completely relaxed position (not shown), measured at the surface 30, is considerably greater than the internal diameter of the brake drum 27. Although the brake shoe, as shown in FIGURE 3, is partially relaxed, it is designed to exert a sufficient force against the drum 27 to retard and completely stop the turbine at a predetermined overspeed.

Those skilled in the art will appreciate that the material, size, and amount of prestress of the brake shoe 25 to accomplish turbine arrest at a predetermined overspeed without fracturing the turbine wheel or associated shafting are dependent upon many variables such as normal operating speeds, strength of the various materials, and braking coefficients of friction.

When the shoe 25 is in the position shown in FIGURE 2, the outer surface 30 is under tension and the inner surface is under compression and the shoe 25 is sized so that the tensile forces in the outer surface 30 are just below the proportional limit of the spring steel from which the shoe is constructed. A maximum self-energizing force is thereby obtained.

Two retaining rings 31 and 32 are cylindrical steel bands which encircle each end of the brake shoe 25 at a reduced portion 33 at each end of the brake shoe 25 and are designed to fracture under a predetermined tensile load. The rings may suitably be constructed from molybdenum steel, AISI 4340, but this is merely exemplary of the material that may be used. The retaining rings 31 and 32 serve to maintain the prestress in the brake shoe in its position shown in FIGURE 2 so that the inner surface of the brake shoe is in contiguous contact with the outer surface of the sleeve 20. It is desirable that the retaining rings 31 and 32 be subjected to an initial preload in addition to the preload on the retaining ring exerted by the stress within the compressed brake shoe 25, and for this purpose the inside diameters of the relaxed retaining rings are sized slightly smaller than the outer diameter of the brake shoe 25 at the reduced portion 33 when the brake shoe is in the position shown in FIGURE 2. In this manner there is a slight interference between the retaining rings and the brake shoe so that the brake shoe and rings are given an initial preload.

The interference fit, described above, is sized to produce an inward preload pressure between the shoe and the support member exceeding in magnitude the outward pressure, resulting from the centrifugal force of the brake shoe at the maximum normal operating speed. In this fashion, the retainer load is made independent of the speed variation in the operating speed range thereby eliminating cyclic stress variation in the shoe or in the retainers. This preload also insures intimate contact between the shoe and the support member throughout the operating speed range, thereby producing a substantially dynamically balanced unit.

The size and material of the retaining rings 31 and 32 are selected so that the rings will fracture under the combined centrifugal and strain forces of shoe acting upon the rings at the maximum desired overspeed of the turbine unit, i.e. somewhere above the maximum normal operating speed but safely below the burst speed of the turbine unit.

The operation of the device is as follows. Assuming the turbine 11 to be rotating within the normal speed range, the retaining rings 31 and 32 will hold the prestressed brake shoe 25 in the position shown in FIGURE 2. However, if the control of the compressed propellant delivered to the buckets 14 malfunctions and delivers excessive pressure to the turbine, or if the turbine load is reduced, the turbine may exceed the normal speed range and go into a state of uncontrolled acceleration. At a predetermined overspeed, somewhere above the maximum operating speed, an equilibrium condition exists where the outward centrifugal forces and the prestress forces of the brake shoe will just equal the initial preload of the retainers 31 and 32. Under these conditions, preload contact between the shoe and the support member will be zero, i.e. while the retainer still holds the brake shoe in the position shown in FIGURE 2, the pressure between the shoe and the support member 20 will be reduced to zero. As the speed of the turbine in shaft 15 increases beyond this equilibrium condition to the maximum overspeed, the retainer load will increase rapidly above its ultimate tensile strength where fracture of the retaining rings occur, at which point the shoe will rapidly move radially outward, as a result of the combined elastic and centrifugal forces of the shoe, and contact the inner surface of the drum 27. The frictional forces generated between the shoe 25 and the drum 27 result in a force applied by the shoe on one of the side faces of the drive key 21 on the support member 20, thereby overcoming the accelerating torque of the propellant on the turbine and decelerating the turbine shaft 15 to a state of rest. The friction resulting from the elastically induced braking surface pressure is sufficient to prevent any further rotation of the turbine 11. Obviously, if the tensile stresses in the outer surface of the brake shoe 25 in its partially relaxed position, or brake engaging position shown in FIGURE 3, were insufficient to hold the turbine unit at rest without the aid of centrifugal forces, the propellant would accelerate the turbine 11. This is undesirable because any malfunction in the propellant control could not be corrected in such a short time. Therefore, those skilled in the art will appreciate that the brake shoe 25 must be prestressed sufficiently to hold the turbine at rest. The energy consumed in arresting the turbine against the forces of the propellant are dissipated in the braking components in the form of heat and may result in some metal melting which, once a state of rest has been achieved, fuses and locks the shoe 25 and the drum 20 together rendering further rotation of the turbine unit impossible.

I claim:

1. A failsafe device for reducing the speed of a turbine drive unit having a turbine wheel below the maximum operating speed thereof against the accelerating forces of a propellant, comprising; a first member driven by said turbine unit, a brake shoe mounted on said first member in contiguous contact therewith and prestressed just below the proportional limit of the material from which the shoe is constructed, a retainer on said shoe for urging said shoe against said first member, said retainer being of sufficient thickness to fracture under the sum of the centrifugal force of the shoe upon the retainer at the maximum desired overspeed and the elastic force of the shoe upon the retainer, and a second stationary member adjacent said shoe whereby the shoe will rapidly recover from its prestressed position upon fracture of the retainer and engage the second member thereby reducing the speed of the turbine unit.

2. A failsafe device for arresting a turbine unit having a turbine wheel at a predetermined maximum overspeed against the accelerating force of a propellent, comprising; a rotatable first member driven by said turbine unit, an integral stressed brake shoe mounted on said first member for rotation therewith and constructed to impart sufficient braking force to said turbine unit to arrest said unit at a predetermined maximum overspeed independent of centrifugal forces thereon, a retainer on said shoe for maintaining said prestress by straining said shoe, said retainer being fracturable when subjected to a predetermined force, and a second member stationary relative to said first member mounted adjacent but spaced from said prestressed shoe, said second member interfering with said shoe when relaxed, whereby said retainer will fracture at a predetermined speed and permit the shoe to relax and engage the second member arresting the turbine unit.

3. A failsafe device for arresting a turbine unit including a turbine wheel at a predetermined maximum overspeed against the accelerating forces of a propellant, comprising; a first rotatable member driven by said turbine unit, a brake shoe mounted on said first member in a prestressed and prestrained position, said first member and said shoe being in contiguous contact when in said prestressed position, a fracturable retainer surrounding said shoe and normally interfering therewith when said shoe is in the prestressed position thereby providing a preload on the retainer, and a second stationary member mounted adjacent but spaced from said first first member for engaging said shoe when said retainer fractures thereby arresting the turbine unit.

4. A failsafe device for arresting a turbine unit having a turbine wheel at a predetermined maximum overspeed against the accelerating forces of the propellant, comprising; a substantially cylindrical member driven in rotation by said turbine unit, a one piece substantially cylindrical sleeve brake shoe surrounding said member and extending substantially 360°, said shoe having an axial separation completely therethrough, means interengaging said member and said shoe, means for prestressing and retaining said shoe against said member, and a drum surrounding said shoe and stationary with respect to said member, whereby the shoe will engage the drum and arrest the turbine unit after overcoming the force of the retainer at a predetermined speed of the turbine unit.

5. A turbine unit comprising: a casing, a turbine wheel mounted in said casing and having buckets thereon for receiving a compressed propellant; a shaft connected to and driven by said turbine wheel; a failsafe device for preventing turbine overspeed including an axially extending key on said shaft, a cylindrical shoe surrounding said shaft and having a slot therein flanking said key, said slot extending completely through said shoe permitting free expansion thereof, at least one fracturable retaining ring surrounding said shoe for prestressing said shoe against said shaft, a stationary drum mounted in said casing surrounding said shoe, whereby said shoe will engage the drum after the retaining ring fractures at a predetermined shaft overspeed.

6. A turbine unit as described in claim 5 and further including; reduced portions on both ends of said shoe, two retaining rings each seated on the reduced end portions of the shoe.

7. A turbine unit as described in claim 6 wherein the internal diameters of said retaining rings are normally smaller than said reduced portions when the shoe is in the prestressed position on the shaft thereby providing a preload; and bearings mounted in the casing and supporting said shaft at both ends of the failsafe device.

8. A failsafe device for preventing turbine overspeed against the accelerating forces of a propellant, comprising; a first rotatable member driven by said turbine, a stationary member having a braking friction surface adjacent but spaced from said first member, a spring loaded brake shoe carried by said first member, said brake shoe being of sufficient size to engage said friction surface when unloaded, and yieldable retaining means engaging said shoe for normally maintaining said shoe out of engagement with said friction surface against the spring loading force, said retaining means being constructed to yield at a predetermined turbine overspeed and release said brake shoe whereby the brake shoe engages the friction surface.

References Cited by the Examiner

UNITED STATES PATENTS

| | | | |
|---|---|---|---|
| 1,469,045 | 9/1923 | MacMurchy | 253—59 |
| 1,600,346 | 9/1926 | MacMurchy. | |
| 2,569,898 | 10/1951 | Millns | 253—59 |
| 2,733,891 | 2/1956 | Millns et al. | 253—59 |
| 2,962,257 | 11/1960 | Allingham | 253—59 |
| 3,048,364 | 8/1962 | Troeger et al. | 253—59 |
| 3,051,440 | 8/1962 | Chandler | 253—77 |
| 3,075,741 | 1/1963 | Laubin | 253—59 |
| 3,158,999 | 12/1964 | Carriere et al. | 60—39.09 |

FOREIGN PATENTS

| | | |
|---|---|---|
| 57,040 | 12/1912 | Austria. |
| 819,400 | 7/1937 | France. |

MARTIN P. SCHWADRON, *Primary Examiner.*

JULIUS E. WEST, SAMUEL LEVINE, *Examiners.*

E. A. POWELL, JR., *Assistant Examiner.*